United States Patent
Yamamoto et al.

[15] 3,682,914
[45] Aug. 8, 1972

[54] 2,6-DIPHENYL-4,5-DIHYDRO-3(2H)-PYRIDIZINONE DERIVATIVES

[72] Inventors: Hisao Yamamoto, No. 10-4, Kawahigashi-cho, Nishinomiya-shi, Hyogo; Toshio Atsumi, No. 14-1, Yoneya Aza Ikenoshita, Takarazuka-shi, Hyogo; Hiroshi Awata, No. 32, Honcho 9-chome, Toyonaka-shi, Osaka, all of Japan

[22] Filed: Nov. 21, 1968

[21] Appl. No.: 777,882

[30] Foreign Application Priority Data

Nov. 22, 1967 Japan...................42/75259

[52] U.S. Cl..............................260/250 A, 424/250
[51] Int. Cl.............................................C07d 51/04
[58] Field of Search.....................................260/250

[56] References Cited

UNITED STATES PATENTS 3,317,530  5/1967  Reicheneder et al......260/250

*Primary Examiner*—Nicholas S. Rizzo
*Attorney*—Sughrue, Rothwell, Mion, Zinn & Macpeak

[57] ABSTRACT

A novel 2,6-diphenyl-4,5-dihydro-3(2H)-pyridazinone derivative having remarkable anti-inflammatory, anti-tuberculous and anti-virus actions represented by the general formula:

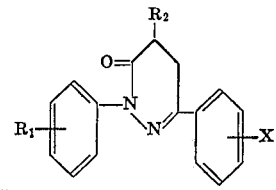

wherein $R_1$ represents a lower alkyl group of from 1–4 carbon atoms, a lower alkoxyl group of from 1–4 carbon atoms, or a lower alkylthio group of from 1–4 carbon atoms; $R_2$ represents a hydrogen or a methyl group; and X represents a halogen atom and a lower alkoxy group which is prepared by reacting a hydrazine derivative with a β-benzoylpropionic acid derivative.

20 Claims, No Drawings

2,6-DIPHENYL-4,5-DIHYDRO-3(2H)-PYRIDIZINONE DERIVATIVES

BACKGROUND OF THE INVENTION

FIELD OF THE INVENTION

The present invention relates to a novel 2,6-diphenyl-4,5-dihydro-3(2H)-pyridazinone derivative and a process for the production of the novel derivative.

SUMMARY OF THE INVENTION

The invention is the discovery of a novel 2,6-diphenyl-4,5-dihydro-3(2H)-pyridazinone derivative represented by the following general formula:

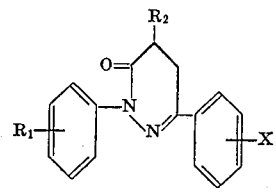

(I)

wherein $R_1$ represents a member selected from the group of from 1–4 carbon atoms consisting of a lower alkyl group of from 1–4 carbon atoms, a lower alkoxy group of from 1–4 carbon atoms and a lower alkylthio group of from 1–4 carbon atoms; $R_2$ represents a member selected from the group consisting of hydrogen and a methyl group; and X represents a member selected from the group consisting of a halogen atom and a lower alkoxy group.

The invention also comprises a process for the production of the above-described novel pyridazinone derivative which comprises reacting, under heating, a hydrazine derivative represented by the following formula:

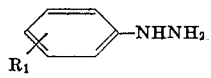

wherein $R_1$ is as heretofore defined; or reacting a salt of the hydrazine derivative described thereof with a β-benzoylpropionic acid derivative represented by the following formula:

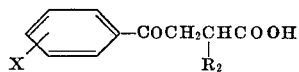

wherein X and $R_2$ are as heretofore defined. The reaction may be performed in a non solvent, or an organic solvent, generally in the presence of a condensing agent.

DETAILED DESCRIPTION OF THE INVENTION

The present invention comprises a novel 2,6-diphenyl-4,5-dihydro-3(2H)-pyridazinone derivative represented by the general formula

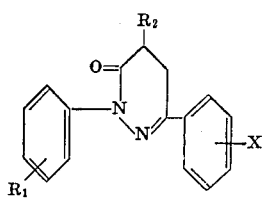

(I)

wherein $R_1$ represents a lower alkyl group of from 1–4 carbon atoms a lower alkoxy group of from 1–4 carbon atoms or a lower alkylthio group of from 1–4 carbon atoms; $R_2$ represents a hydrogen or a methyl group of from 1–4 carbon atoms and X represents a halogen atom and a lower alkoxy group.

The present invention also comprises a process for the production of the aforesaid novel pyridazinone derivative in good yields by reacting, under heating, a hydrazine derivative represented by general formula (II):

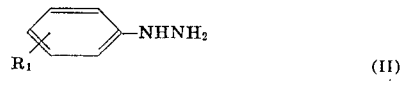

(II)

wherein $R_1$ is as above defined; or reacting a salt thereof with a β-benzoylpropionic acid derivative represented by general formula (III):

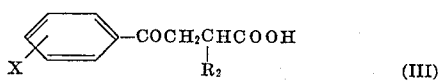

(III)

wherein X and $R_2$ are as above defined, in a non-solvent, or an organic solvent generally in the presence of a condensing agent.

The present process proceeds even without a solvent, but it may preferably be carried out in a suitable solvent. As solvents, there are employed organic acids, such as acetic acid, formic acid, propionic acid, lactic acid, butyric acid and the like; hydrocarbon solvents such as cyclohexane, n-hexane, benzene, toluene and the like; general organic solvents such as dioxane, dimethylformamide and the like; and alcohols such as methanol, ethanol, propanol and the like.

The reaction usually proceeds in the temperature range of from about 50° to about 200°C., but 60°–100 °C. is most preferred.

The reaction may even be carried out in the absence of a condensing agent but the use of the condensing agent is desirable to obtain good yields of the product. As the condensing agents used in the present invention, there are illustrated mineral acids, such as hydrochloric acid, sulfuric acid, phosphoric acid, and the like; Lewis acids such as zinc chloride, copper chloride, borofluorides and the like; polyphosphoric acids; cation exchange resins; etc.

The 2,6-diphenyl-4,5-dihydro-3(2H)-pyridazinone derivatives of this invention are novel compounds that have never been reported in the literature, and show remarkable anti-inflammatory, anti-tuberculous and anti-virus activities, with minimum toxicity.

For example, the 2-(p-methoxyphenyl)-6-(p-chlorophenyl)-4,5-dihydro-3(2H)-pyridazinone of this invention exhibits a potential inhibition of carrageenin-induced edema in rats' hind paws with lower acute toxicity per OS, in comparison with the most notable anti-inflammatory drug, phenylbutazone (1,2-diphenyl-3,5-dioxo-4-n-butylpyrazolidine) as follows:

| | 50% inhibition of carrageenin induced edema in rats' hind paws ($ED_{50}$) | 50% lethal dose $LD_{50}$ | $ED_{50}$ $LD_{50}$ |
|---|---|---|---|
| 2-(p-methoxyphenyl)-6-(p-chlorophenyl)-4,5-dihydro-3(2H)-pyridazinone | 65 mg./kg. | 1000 mg./kg. | 15.4 |

| | | | |
|---|---|---|---|
| Phenylbutazone | 320 mg./kg. | 630 mg./kg. | 2.0 |

In addition to the above-mentioned compound, 2-(p-methylthiophenyl)-6-(p-chlorophenyl)-4,5-dihydro-3(2H)-pyridazinone, 2-(p-methoxyphenyl)-6-(p-bromophenyl)-4,5-dihydro-3(2H)-pyridazinone, 2-(p-methylthiophenyl)-6-(p-bromophenyl)-4,5-dihydro-3(2H)-pyridazinone, and 2-(p-ethoxyphenyl)-6-(p-chlorophenyl)-4,5-dihydro-3-(2H)-pyridazinone all have notably pharmacological potentcies similar to 2-(p-methoxyphenyl)-6-(p-chlorophenyl)-4,5-dihydro-3(2H)-pyridazinone.

Further, 2-(p-ethoxyphenyl)-6-(p-chlorophenyl)-4,5-dihydro-3(2H)-pyridazinone and 2, 6-di-(p-ethoxyphenyl)-4,5-dihydro-3(2H)-pyridazinone have shown a potential inhibition for Mycobacterium tuberculosis, $H_{37}Rv$. The minimum inhibition concentrations ($\gamma$/ml) of these compounds in the Kirchner medium are 5.7 and 25, respectively, and they show the same, or a greater potential, than p-aminosalicylic acid (PAS) in inhibiting Mycobacterium tuberculosis during a 2 week period.

Finally, these products exhibited an anti-myxovirus activity.

The preferable substitutents of the compound of this invention represented by formula I are as follows:

R: methyl group, ethyl group, isopropyl group, methoxy group, ethoxy group, methylthio group and ethylthio group.

X: chlorine atom, bromine atom and methoxy group.

However, it should be noted that the above substituents are only preferable examples and other substituents may be used in the present invention.

Typical examples of the 2,6-diphenyl-4,5-dihydro-3(2H)-pyridazinone derivatives of the present invention are, for example, 2-(p-methoxyphenyl)-6-(p-chlorophenyl)-4,5-dihydro-3(2H)-pyridazinone, 2-(p-tolyl)-6-(p-chlorophenyl)-4,5-dihydro-3(2H)-pyridazinone, 2-(p-methylthiophenyl)-6-(p-chlorophenyl)-4,5-dihydro-3(2H)-pyridazinone, 2-(p-methoxyphenyl)-6-(p-bromophenyl)-4,5-dihydro-3(2H)-pyridazinone, 2-(p-tolyl)-6-(p-bromophenyl)-4,5-dihydro-3(2H)-pyridazinone, 2-(m-methoxyphenyl)-6-(p-chlorophenyl)-4,5-dihydro-3(2H)-pyridazinone, 2-(p-methoxyphenyl)-6-(m-chlorophenyl)-4,5-dihydro-3(2H)-pyridazinone, 2-(p-ethoxyphenyl)-6-(p-chlorophenyl)-4,5-dihydro-3(2H)-pyridazinone, 2-(p-methoxy)-4-methyl-6-(p-chlorophenyl)-4,5-dihydro-3(2H)-pyridazinone, 2-(p-tolyl)-4-methyl-6-(p-chlorophenyl)-4,5-dihydro-3(2H)-pyridazinone and 2-(p-methoxyphenyl)-6-(p-methoxyphenyl)-4,5-dihydro-3(2H)-pyridazinone.

The invention will now be explained in detail by reference to the following examples, but it will be understood that the invention is not to be thereby limited, and various changes can be applied within the scope of this invention.

EXAMPLE 1

To a mixture of 5.5 g. of p-methoxyphenylhydrazine, 8.5 g. of $\beta$-(p-chlorobenzoyl) propionic acid, and 1 ml. of glacial acetic acid there was added 30 ml. of benzene. The mixture was then refluxed for 1 hour in a nitrogen stream. Thereafter, benzene was distilled off to yield a residue which was stirred and heated at 90°–100b$LC$. for 7 hours in 20 ml. of glacial acetic acid containing about 2 g. of hydrogen chloride. A solvent was removed under reduced pressure to give 13.9 g. of a brown oily substance. The oily substance was treated with ether and recrystallized from ether to give 8.7 g. of the white needles of 2-(p-methoxyphenyl)-6-(p-chlorophenyl)-4,5-dihydro-3-(2H)-pyridazinone. The melting point was 98.5°–99.5°C. Infra-red absorption spectrum $\gamma max^{paraffin}$ (cm$^{-1}$): 1,673 (NCO).

Elementary analysis:

| | C(%) | H(%) | N(%) |
|---|---|---|---|
| Calculated (for $C_{17}H_{15}ClN_2O_2$) | 64.78 | 4.76 | 9.33 |
| Found | 64.86 | 4.77 | 8.90 |

NMR (CDCl$_3$, T. M. S. ):

7.47–6.82 (multiplet, $A_2B_2$ type methylene, 4H)
6.22 (singlet, methoxymethyl, 3H)
3.17–2.75 (multiplet, ring proton, 8H).

EXAMPLE 2

A mixture of 9 g. of p-methoxyphenylhydrazine, 12.7 g. of $\beta$-(p-methoxybenzoyl) propionic acid, 2 ml. of glacial acetic acid, and 45 ml. of benzene was heated under reflux for 15 minutes. Benzene was removed to yield a residue, which was heated at 95°–107°C., for 6.5 hours in 45 ml. of glacial acetic acid contained about 3. g. of hydrogen chloride. Recrystallization (twice) from ethanol gave 9.5 g. of the colorless crystals of 2-(p-methoxyphenyl)-6-(p-methoxyphenyl)-4,5-dihydro-3(2H) pyridazinone, having a melting point of 105°–106°C. Infra-red absorption spectrum $\gamma max^{paraffin}$ (cm$^{-1}$): 1,675 (NCO).

Analysis:
Calculated for $C_{18}H_{18}N_2O_3$; C, 69.66; H, 5.85; N, 9.03.
Found: C, 70.17; H, 6.00; N, 8.94.
NMR (CDCl$_3$, T. M. S. )
7.48–6.82 (multiplet, $A_2B_2$ type methylene, 4H)
6.22 $\gamma$ (singlet, methoxymethyl, 3H)
6.20 $\gamma$ (singlet, methoxymethyl, 3H)
3.20–2.23 $\gamma$ (multiplet, ring proton, 8H)

To further define the invention, $R_1$ may have from one to four carbon atoms, and all examples were performed under normal pressure.

What is claimed is:

1. A 2,6-diphenyl-4,5-dihydro-3(2H)-pyridazinone derivative having the formula

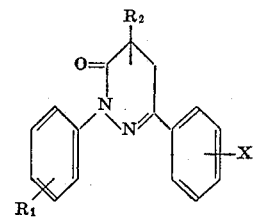

wherein $R_1$ represents a member selected from the group consisting of a lower alkyl group of from 1–4 carbon atoms, a lower alkoxy group of from 1–4 carbon atoms, and a lower alkylthio group of from 1–4 carbon atoms; $R_2$ is a member selected from the group consisting of hydrogen and a methyl group; and X represents a member selected from the group consisting of a halogen atom and a lower aloxy group.

2. The derivative of claim 1 which is 2-(p-methoxyphenyl)-6-(p-chlorophenyl)-4,5-dihydro-3(2H)-pyridazinone.

3. The derivative of claim 1 which is 2-(p-tolyl)-6-(p-chlorophenyl)-4,5-dihydro-3(2H)-pyridazinone.

4. The derivative of claim 1 which is 2-(p-methylthiophenyl)-6-(p-chlorophenyl)-4,5-(p-dihydro-3(2H)-pyridazinone.

5. The derivative of claim 1 which is 2-(p-methoxyphenyl)-6-(p-bromophenyl)-4,5-dihydro-3(2H)-pyridazinone.

6. The derivative of claim 1 which is 2-(p-tolyl)-6-(p-bromophenyl)-4,5-dihydro-3(2H)-pyridazinone.

7. The derivative of claim 1 which is 2-(m-methoxyphenyl)-6-(p-bromophenyl)-4,5-dihydro-3(2H)-pyridazinone.

8. The derivative of claim 1 which is 2-(m-methoxyphenyl-6-(p-chlorophenyl)-4,5-dihydro-3(2H)-pyridazinone.

9. The derivative of claim 1 which is 2-(p-methoxyphenyl)-6-(m-chlorophenyl)-4,5-dihydro-3(2H)-pyridazinone.

10. The derivative of claim 1 which is 2-(p-ethoxyphenyl)-6-(p-chlorophenyl)-4,5-dihydro-3(2H)-pyridazinone.

11. The derivative of claim 1 which is 2-(p-methoxyphenyl)-6-(p-methoxyphenyl)-4,5-dihydro-3(2H)-pyridazinone.

12. A process for the production of a 2,6-diphenyl-4,5-dihydro-3(2H)-pyridazinone derivative represented by the general formula

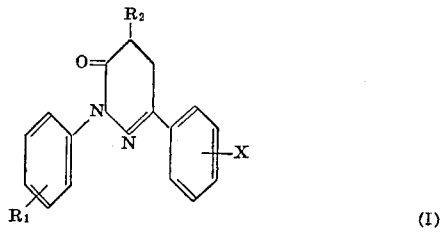

(I)

wherein $R_1$ represents a member selected from the group consisting of a lower alkyl group of from 1–4 carbon atoms, a lower alkoxy group of from 1–4 carbon atoms, and a lower alkylthio group of from 1–4 carbon atoms; $R_2$ is a member from the group consisting of hydrogen atom and a methyl atom; and X represents a member from the group consisting of a halogen atom and a lower alkoxy group, which comprises reacting a member selected from the group consisting of a hydrazine derivative represented by the general formula

(II)

wherein $R_1$ is as defined above, and a salt thereof with a β-benzoylpropionic acid derivative represented by the general formula

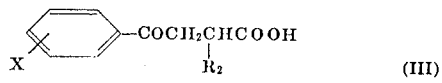

(III)

wherein $R_2$ and X are defined above, at a temperature within the range of from about 50° to about 200°C.

13. The process as claimed in claim 12 wherein said hydrazine derivative is selected from the group consisting of p-methoxyphenylhydrazine, p-tolylhydrazine, p-methylthiophenylhydrazine and m-methoxyphenylhydrazine.

14. The process as claimed in claim 12 wherein said β-benzoylpropionic acid derivative is selected from the group consisting of β-(p-chlorobenzoyl)propionic acid, β-(p-bromobenzoyl)propionic acid and β-(p-methoxybenzoyl)propionic acid.

15. The process of claim 12 wherein said reaction is conducted in the absence of a condensing agent.

16. The process of claim 12 wherein said reaction is conducted in the presence of a condensing agent.

17. The process as claimed in claim 12 wherein said reaction is conducted in an organic solvent.

18. The process as claimed in claim 17 wherein said organic solvent is selected from the group consisting of acetic acid, formic acid, propionic acid, lactic acid, butyric acid.

19. The process as claimed in claim 17 wherein said solvent is selected from the group consisting of benzene, cyclohexane, n-hexane, toluene, methanol, ethanol and propanol.

20. The derivative of claim 1, wherein said lower alkyl group is a methyl group or an ethyl group, wherein said lower alkoxy group is a methoxy group, and ethoxy group, or an isopropoxy group, and wherein said lower alkylthio group is a methylthio group or an ethylthio group.

* * * * *